(No Model.)
O. S. GANDY.
HANDLE FOR BUCKETS OR FRUIT BASKETS.
No. 410,686. Patented Sept. 10, 1889.
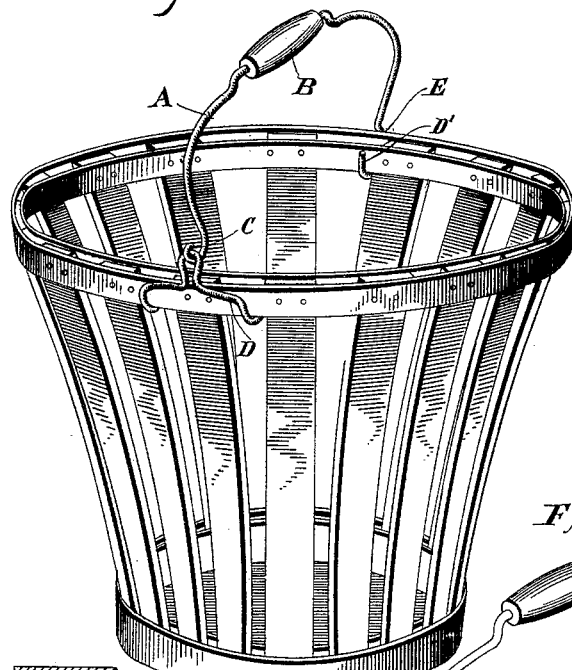
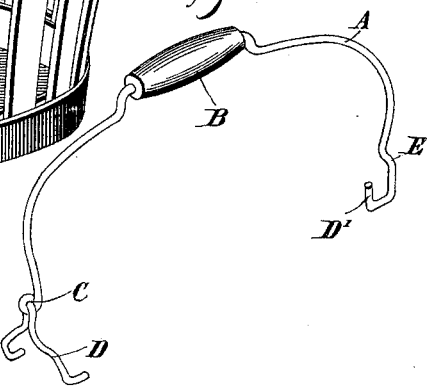
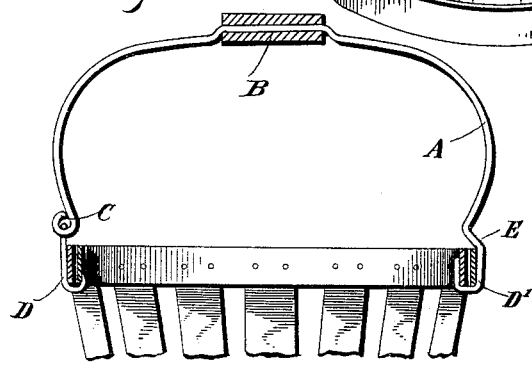
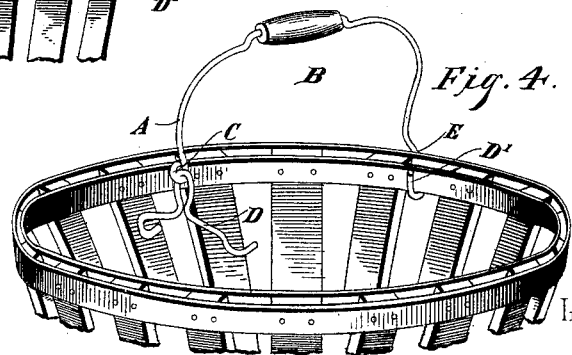
Witnesses,
Inventor,
Oliver S. Gandy,
By his Attorneys,

UNITED STATES PATENT OFFICE.

OLIVER S. GANDY, OF NEWPORT, NEW JERSEY.

HANDLE FOR BUCKETS OR FRUIT-BASKETS.

SPECIFICATION forming part of Letters Patent No. 410,686, dated September 10, 1889.

Application filed July 22, 1889. Serial No. 318,254. (No model.)

*To all whom it may concern:*

Be it known that I, OLIVER S. GANDY, a citizen of the United States, residing at Newport, in the county of Cumberland and State of New Jersey, have invented a new and useful Handle for Buckets, Fruit-Baskets, &c., of which the following is a specification.

My invention relates to improvements in handles for buckets, fruit-baskets, and similar articles; and it consists in certain novel features hereinafter described and claimed.

In the accompanying drawings, Figure 1 is a perspective view showing my improved handle applied to a fruit-basket. Fig. 2 is a perspective view of the handle detached. Fig. 3 is a vertical section. Fig. 4 is a perspective view showing the manner of applying the handle.

The handle is composed of a metallic bail A, which may or may not be provided at its center with the usual wooden sleeve B, as may be desired. One end of the bail is bent to form the eye C, in which a fork D is loosely hung. The opposite end of the bail is bent to provide the inwardly and upwardly extending hook D', and a proper distance above the said hook the shoulder E is formed, which projects outward, as clearly shown.

In practice the hook D' is engaged in the band which passes around the top of the bucket or basket and between two of the staves of the vessel or between the band and the body of the vessel. The shoulder E enables the bail to clear the upper edge of the band and thereby be securely fulcrumed on the band. The bail is then swung horizontally, so as to bring the swinging fork D to a point diametrically opposite to the hook, and the said fork is then made to engage under the band. The vessel can then be easily lifted and carried from place to place.

It will be observed that I have provided a very simple handle for fruit-baskets and similar vessels which can be quickly applied and removed, and which, when applied, will hold the vessel very firmly. The hook D' and the shoulder E fit closely around the band and form a steady fulcrum for the handle in applying and removing the same.

Having thus described my invention, what I claim, and desire to secure by Letters Patent, is—

1. The improved handle for buckets and other vessels, consisting of a bail provided at one end with a shoulder E and a hook D' and at its other end with a swinging hooked fork D, swiveled thereto, as set forth.

2. The movable handle for baskets, provided at one end with a rigid hook adapted to engage the rim of the basket and form a fulcrum and having a swinging hooked fork at its other end, as set forth.

In testimony that I claim the foregoing as my own I have hereto affixed my signature in presence of two witnesses.

OLIVER S. GANDY.

Witnesses:
   HARRY P. GANDY,
   PAUL T. LUDLAM.